US010133342B2

(12) United States Patent
Mittal et al.

(10) Patent No.: US 10,133,342 B2
(45) Date of Patent: Nov. 20, 2018

(54) HUMAN-BODY-GESTURE-BASED REGION AND VOLUME SELECTION FOR HMD

(71) Applicant: QUALCOMM Incorporated, San Diego, CA (US)

(72) Inventors: Arpit Mittal, Cambridge (GB); Giuliano Maciocci, Cambridge (GB); Michael L. Tunmer, Cambridge (GB); Paul Mabbutt, Peterborough (GB)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 13/767,820

(22) Filed: Feb. 14, 2013

(65) Prior Publication Data

US 2014/0225918 A1   Aug. 14, 2014

(51) Int. Cl.
*G06F 3/01* (2006.01)
*G06T 19/00* (2011.01)
(Continued)

(52) U.S. Cl.
CPC .......... *G06F 3/011* (2013.01); *G02B 27/0093* (2013.01); *G02B 27/017* (2013.01);
(Continued)

(58) Field of Classification Search
CPC ...... G06F 3/005; G06F 3/017; G06F 3/04815; G06T 19/006
See application file for complete search history.

(56) References Cited

U.S. PATENT DOCUMENTS 7,148,913 B2   12/2006   Keaton et al.
7,483,057 B2    1/2009   Grosvenor et al.
(Continued)

FOREIGN PATENT DOCUMENTS

CN       1648840 A   8/2005
CN     102566756 A   7/2012
(Continued)

OTHER PUBLICATIONS

Haritaoglu, I., "InfoScope: Link from Real World to Digital Information Space," Lecture notes in Computer Science/Computational Science, vol. 2201, Jan. 1, 2001, pp. 247-255.
(Continued)

*Primary Examiner* — Jeffrey A Gaffin
*Assistant Examiner* — Richard M Russell
(74) *Attorney, Agent, or Firm* — Kilpatrick Townsend & Stockton/Qualcomm

(57) ABSTRACT

Methods, systems, computer-readable media, and apparatuses for selecting an Augmented Reality (AR) object on a head mounted device (HMD) are presented. In some embodiments, an HMD may define a Region-of-Interest (ROI) based on a gesture formed by at least one hand of a user. Subsequently the HMD may display to the user a shape on the HMD. In at least one arrangement, the shape outlines the ROI. Additionally, the HMD may display to the user a plurality of AR objects, each of the plurality of AR objects being associated with a target inside the ROI. Furthermore, the HMD may reduce the size of the ROI based on a first movement of the at least one hand of the user to form a reduced-sized ROI. In at least one arrangement, the reduced-sized ROI is used to select a specific AR object from the plurality of AR objects.

31 Claims, 9 Drawing Sheets

(51) Int. Cl.

| | | |
|---|---|---|
| *G06F 3/03* | (2006.01) | |
| *G06F 3/0484* | (2013.01) | |
| *G02B 27/01* | (2006.01) | |
| *G02B 27/00* | (2006.01) | |

(52) U.S. Cl.
CPC ............ *G06F 3/017* (2013.01); *G06F 3/0304* (2013.01); *G06F 3/04842* (2013.01); *G06T 19/006* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 8,558,759 B1* | 10/2013 | Prada Gomez et al. | 345/7 |
| 8,837,780 B2* | 9/2014 | Jia et al. | 382/103 |
| 9,076,033 B1* | 7/2015 | Barron et al. | |
| 2003/0202683 A1* | 10/2003 | Ma et al. | 382/104 |
| 2008/0186255 A1 | 8/2008 | Cohen et al. | |
| 2009/0110235 A1 | 4/2009 | Marti | |
| 2010/0199232 A1 | 8/2010 | Mistry et al. | |
| 2011/0158478 A1 | 6/2011 | Yamada et al. | |
| 2012/0019557 A1* | 1/2012 | Aronsson | G06T 11/00 345/633 |
| 2012/0038671 A1* | 2/2012 | Min | G06T 19/00 345/633 |
| 2012/0092369 A1* | 4/2012 | Kim | G06T 19/006 345/633 |
| 2012/0139907 A1* | 6/2012 | Lee | G06F 3/0304 345/419 |
| 2012/0302289 A1 | 11/2012 | Kang | |
| 2013/0328925 A1* | 12/2013 | Latta | G09G 3/003 345/633 |
| 2014/0361988 A1* | 12/2014 | Katz et al. | 345/156 |

FOREIGN PATENT DOCUMENTS

| | | |
|---|---|---|
| JP | 2003323693 A | 11/2003 |
| JP | 2008017501 A | 1/2008 |
| JP | 2010067083 A | 3/2010 |
| JP | 2010206673 A | 9/2010 |
| TW | 201224516 A | 6/2012 |
| WO | 2012038585 A1 | 3/2012 |
| WO | 2012093394 A2 | 7/2012 |

OTHER PUBLICATIONS

Heidemann, G., et al., "Multimodal Interaction in an Augmented Reality Scenario," ACM, 2 Penn Plaza, Suite 701—New York, USA, Oct. 2004 (Oct. 2004), pp. 53-60.

International Search Report and Written Opinion—PCT/US2014/015946—ISA/EPO—dated Jun. 11, 2014.

Lo, R., et al., "Augmediated reality system based on 3D camera selfgesture sensing," 2013 IEEE International Symposium on Technology and Society (ISTAS): Social Implications of Wearable computing and augmediated reality in everyday life, Jun. 27, 2013, pp. 20-31.

Kolsch, et al., "Vision-based Interfaces for Mobility", Proceedings of the First Annual International Conference on Mobile and Ubiquitous Systems: Networking and Services, 2004, pp. 86-94.

Toyama, et al., "Gaze Guided Object Recognition Using a Head-Mounted Eye Tracker," ETRA '12 Proceedings of the Symposium on Eye Tracking Research and Applications, 2012, pp. 91-98.

Taiwan Search Report—TW103104784—TIPO—dated May 5, 2015.

* cited by examiner

US 10,133,342 B2

HUMAN-BODY-GESTURE-BASED REGION AND VOLUME SELECTION FOR HMD

BACKGROUND

Aspects of the disclosure relate to selecting an augmented reality (AR) object on a head mounted display (HMD) using human body gestures.

An HMD can now be developed as a light, affordable device with some degree of computing power either built in or provided by a host device that is connected to the HMD, such as a smartphone.

An HMD can include one or more egocentric cameras mounted on the glass frame. An HMD can also include optical sensors, accelerometers, GPS, gyroscopes, solid state compasses, RFID and wireless sensors. An HMD can have a transparent display area within a user's field of view in which a user can view both physical objects and virtual objects on the display.

Using the built-in cameras, an HMD can capture images and videos according to user's input. Conventional methods include a user touching a button on the HMD to capture an image in the user's field of view.

BRIEF SUMMARY

Certain embodiments are described that allow a user to select one or more augmented reality (AR) objects on a head mounted display (HMD) without a user physically touching the HMD.

In some embodiments, an HMD may define a region-of-interest (ROI) based on a gesture formed by at least one hand of a user. Subsequently the HMD may display to the user a shape on the HMD. In at least one arrangement, the shape outlines the ROI. Additionally, the HMD may display to the user a plurality of AR objects, each of the plurality of AR objects being associated with a target inside the ROI. Furthermore, the HMD may reduce the size of the ROI based on a first movement of the at least one hand of the user to form a reduced-sized ROI. In at least one arrangement, the reduced-sized ROI is used to select a specific AR object from the plurality of AR objects. In one or more arrangements, the method for reducing the size of the ROI comprises of moving the user's hands closer to each other. Additionally, the HMD may disengage the reduced-sized ROI based on a disengagement event. For example, the disengagement event may occurs when the at least one hand of the user is away from the ROI, when at least one finger and thumb of the user are closed together, or when a voice command by the user.

In another arrangement, wherein multiple augmentations are associated with the specific AR object, the HMD may further display to the user a corresponding augmentation from the multiple augmentations associated with the specific AR object based on a second movement of the at least one hand of the user in the direction of the specific AR object.

In another arrangement, the HMD may further capture text inside the reduced-sized ROI; and initialize translation based on the captured text. The HMD can also perform automatic visual recognition and visual search of the ROI or reduced-sized ROI.

In another arrangement, the HMD may use the reduced-sized to narrow a field of view during a video sharing with one or more other user.

In some embodiments, a head mounted device (HMD) for selecting an augmented reality (AR) object may comprise: one or more processors; and memory storing computer-readable instructions that, when executed by the one or more processors, cause the HMD to: define a region-of-interest (ROI) based on a gesture formed by at least one hand of a user; display to the user a shape on the HMD, wherein the shape outlines the ROI; display to the user a plurality of AR objects, each of the plurality of AR objects being associated with a target inside the ROI; and reduce the size of the ROI based on a first movement of the at least one hand of the user to form a reduced-sized ROI, wherein the reduced-sized ROI is used to select a specific AR object from the plurality of AR objects.

In some embodiments, one or more computer-readable media storing computer-executable instructions for selecting an augmented reality (AR) object on a head mounted device (HMD) that, when executed, may cause one or more computing devices included in a HMD to: define a region-of-interest (ROI) based on a gesture formed by at least one hand of a user; display to the user a shape on the HMD, wherein the shape outlines the ROI; display to the user a plurality of AR objects, each of the plurality of AR objects being associated with a target inside the ROI; and reduce the size of the ROI based on a first movement of the at least one hand of the user to form a reduced-sized ROI, wherein the reduced-sized ROI is used to select a specific AR object from the plurality of AR objects.

In some embodiments, a head mounted device (HMD) for selecting an Augmented Reality (AR) object may comprise: a means for defining a region-of-interest (ROI) based on a gesture formed by at least one hand of a user; a means for displaying to the user a shape on the HMD, wherein the shape outlines the ROI; means for displaying to the user a plurality of AR objects, each of the plurality of AR objects being associated with a target inside the ROI; and a means for reducing the size of the ROI based on a first movement of the at least one hand of the user to form a reduced-sized ROI, wherein the reduced-sized ROI is used to select a specific AR object from the plurality of AR objects.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1A:
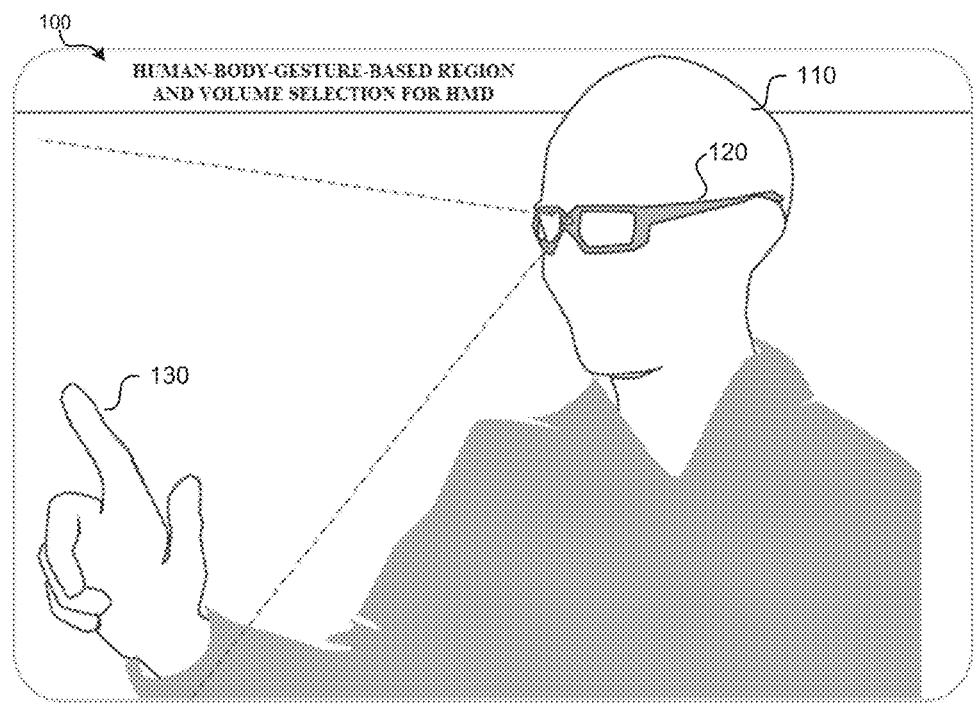
FIGS. 1A and 1B illustrate simplified diagrams of an HMD that may incorporate one or more embodiments.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Embodiments of the present invention are directed toward selecting an augmented reality (AR) object on a head mounted display (HMD) using human body gestures. Some embodiments disclose methods for selecting one or more augmented reality (AR) objects on a head mounted display (HMD) without a user physically touching the HMD.

An HMD can provide augmented reality (AR) functionality by overlaying physical objects viewed by a user with digital content (e.g., text, pictures, video) associated with the physical objects, or associated with the user's location and/or context, for example. For example, an HMD with augmented reality (AR) capabilities can place images of both the physical world and virtual objects over the user's field of view. As a result, an HMD can provide users with a mobile and collaborative AR experience.

As used herein, the term HMD refers to a device that captures distance sensor data and has a display capability linked to a mobile processor, which may be a separate device relative to the head mounted device. In an embodiment, the HMD 120 may be an accessory for a mobile device CPU (e.g., the processor of a cell phone, tablet computer, smartphone, etc.) with the main processing of the HMD control system being performed on the processor of mobile device. In another embodiment, the HMD 120 may comprise a processor, a memory, a display and a camera.

In another embodiment, the HMD may include a wireless interface for connecting with the Internet, a local wireless network, or another computing device. In another embodiment, a projector may be associated in the HMD to enable projection of images onto surfaces. The HMD is preferably lightweight and constructed to avoid use of heavy components, which could cause the device to be uncomfortable to wear. The HMD may also be operable to receive audio/gestural inputs from a user. Such gestural or audio inputs may be spoken voice commands or a recognized user gesture, which when recognized by a computing device may cause that device to execute a corresponding command.

Augmented reality (AR) can be a live, direct or indirect, view of a physical, real-world environment whose elements are augmented by computer-generated sensory input such as, but not limited to, sound, text, graphics, video, and GPS data.

By using AR technology such as object recognition, the information about the surrounding real world of the user becomes interactive and digitally manipulable. Artificial information about the user's environment and its objects can be overlaid on the real world.

Further, although embodiments are described herein with respect to a HMD, those of skill in the art will appreciate that other forms of head-mounted displays may be utilized. For example, embodiments described herein may be implemented with respect to one or more contact lenses that a user may wear and/or may be implemented in another form of display through which a user may perceive a field of view.

Some embodiments allow for interacting with an HMD to select geo-located point-of-interest (POI) and AR targets. By detecting a natural human body gesture, the system can trigger an HMD to select a subset of the POIs or AR targets within the ROI seen through the glasses.

The various embodiments include methods of selecting AR targets in an augmented reality system, including defining a ROI based on user's gesture by capturing spatial data with one or more head mounted sensors, displaying a shape outlining the ROI on the display of the HMD, calculating parameters including distance with respect to the HMD that corresponds to the AR targets, displaying a plurality of AR objects within the ROI, reducing the size of the ROI based on user's hand movement and using a reduced-sized ROI to select a specific AR target. In an embodiment, the method may include continuously updating the display of the generated virtual object so the virtual object appears anchored to display as the user turns his/her head.

Figure 1B:
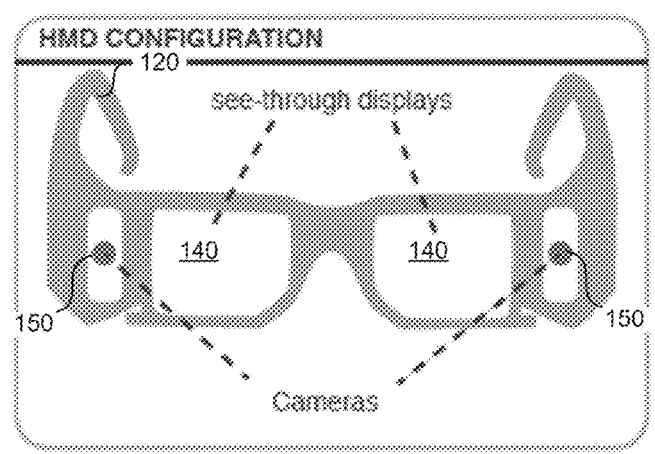

FIGS. 1A-B illustrates simplified diagrams of an HMD 120 that may incorporate one or more embodiments.

Figure 2:
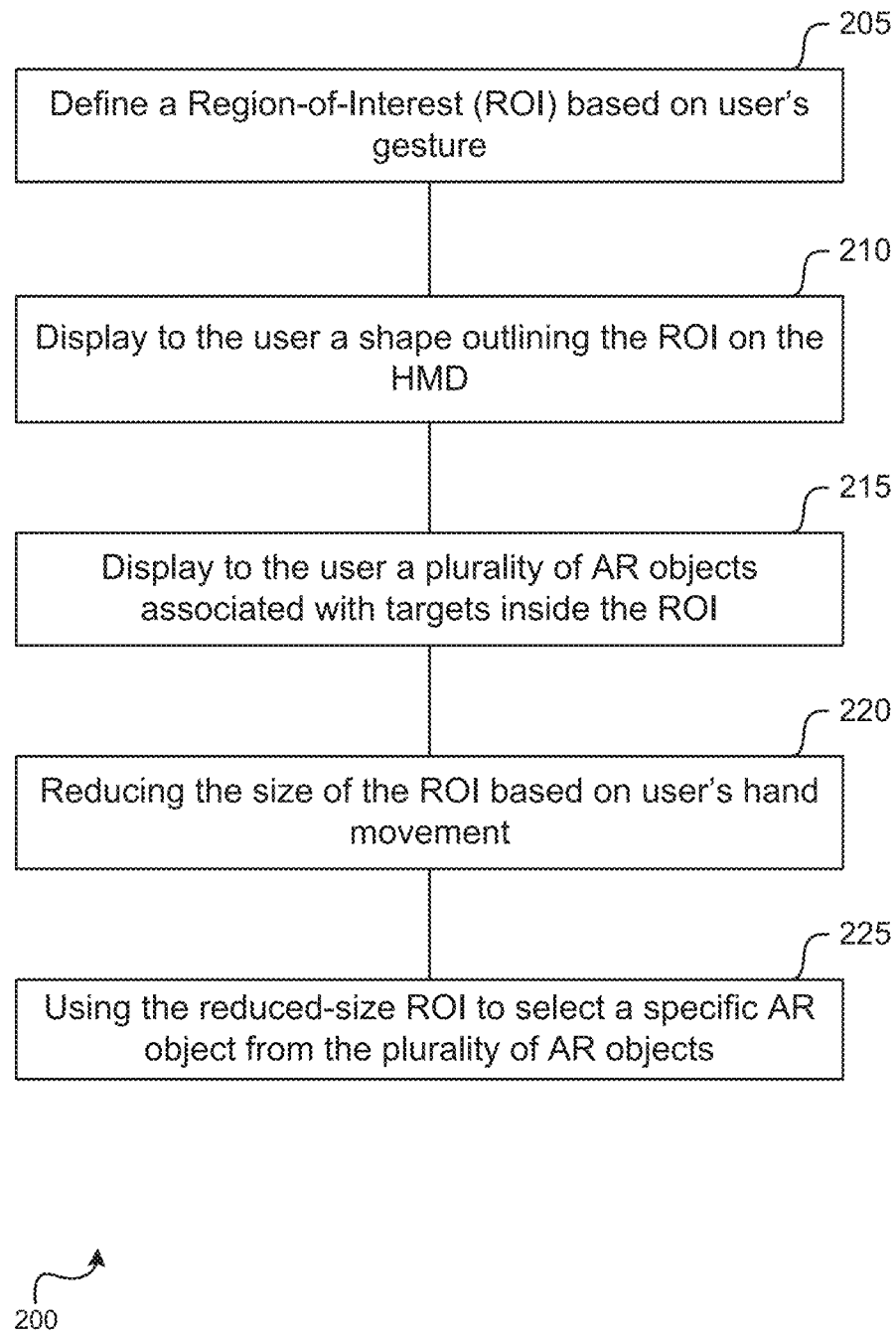
FIG. 2 illustrates a flowchart describing a touch-less method of interacting with HMDs to select AR targets, according to an embodiment.
Figure 3:
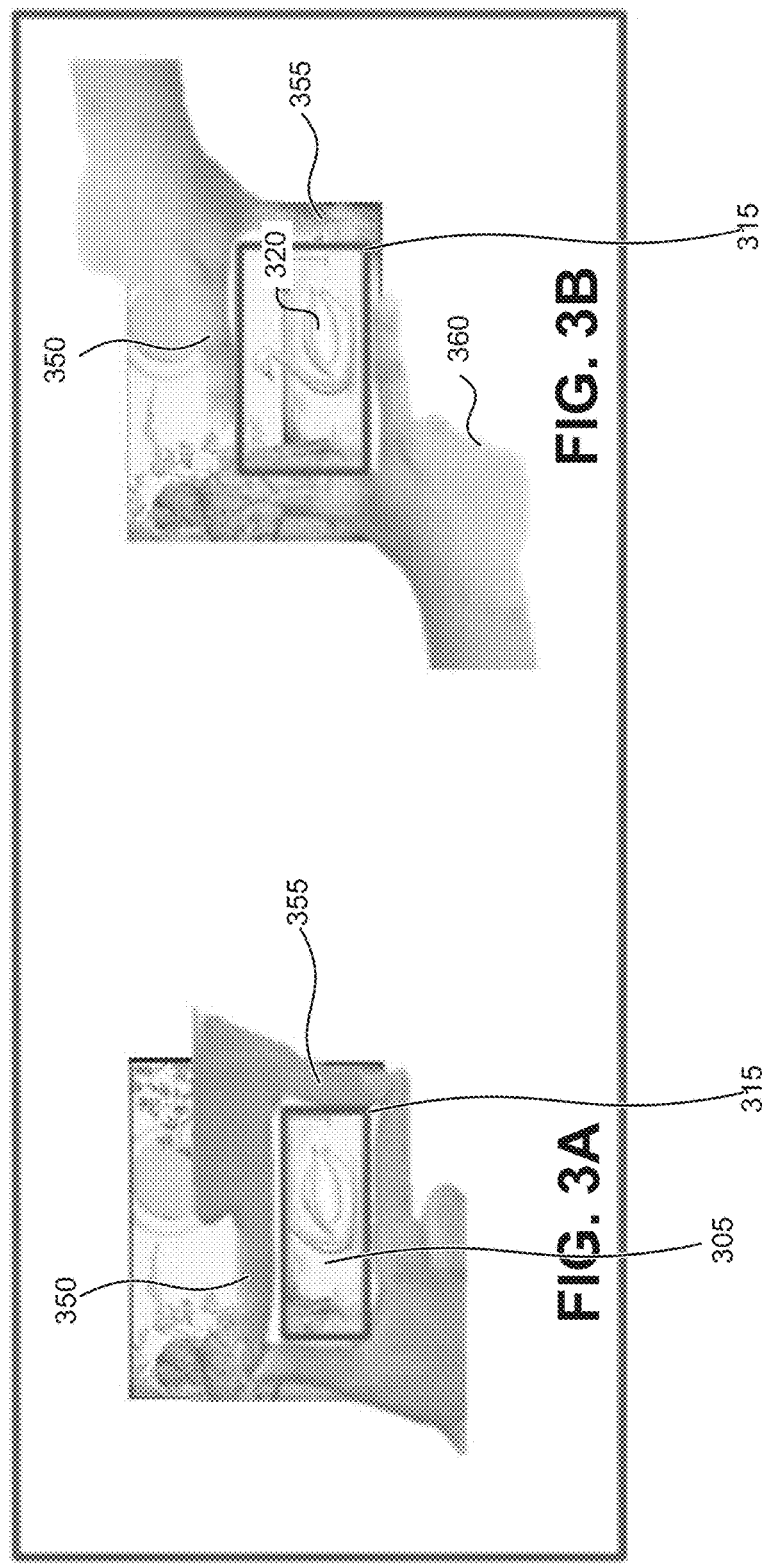
FIGS. 3A and 3B illustrate methods for selecting a region-of-interest (ROI), according to an embodiment.
Figure 4:
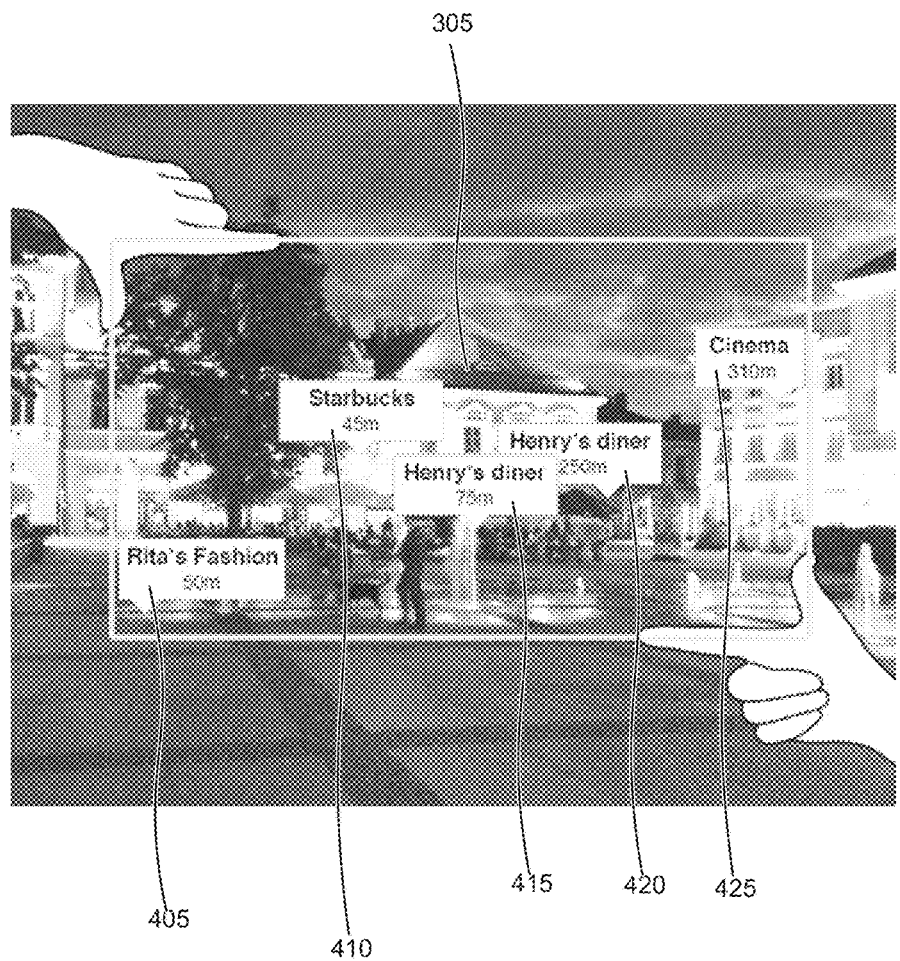
FIG. 4 illustrates a ROI with five targets displayed on the HMD, according to an embodiment.
Figure 5:
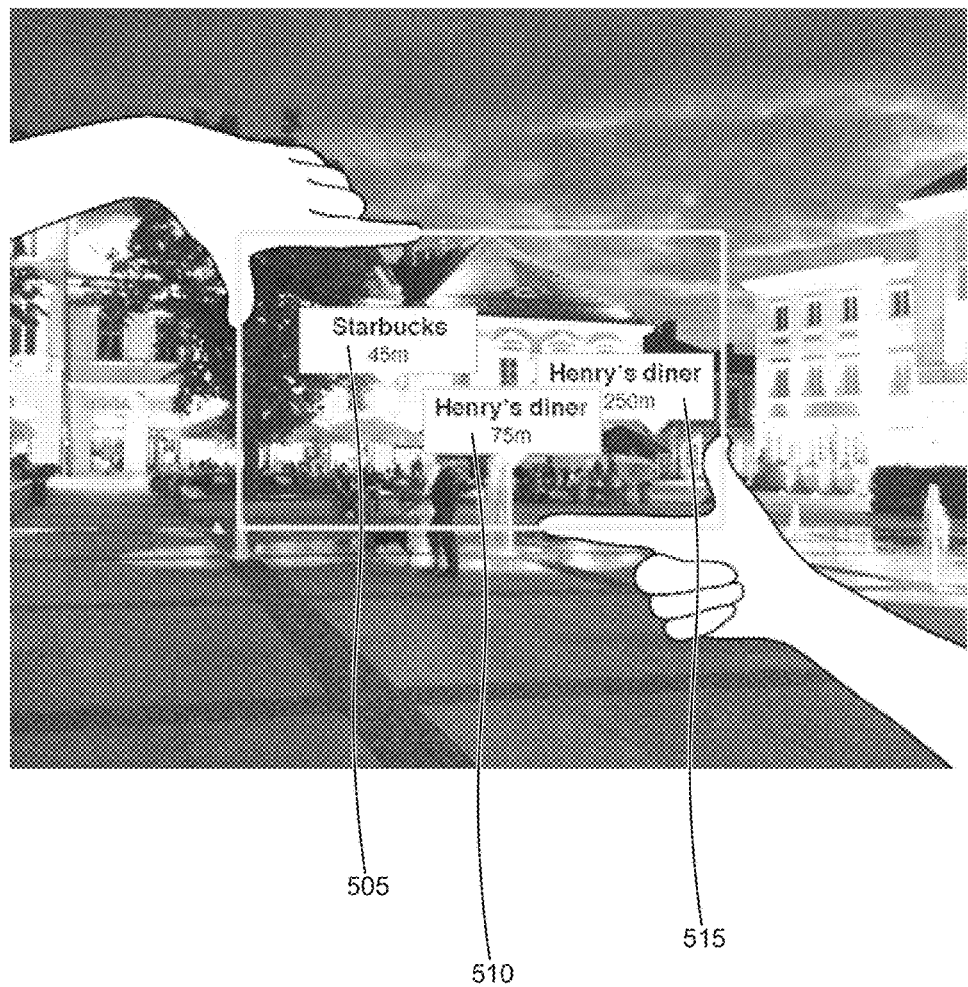
FIG. 5 illustrates a reduced-size ROI with three targets displayed on the HMD, according to an embodiment.
Figure 7:
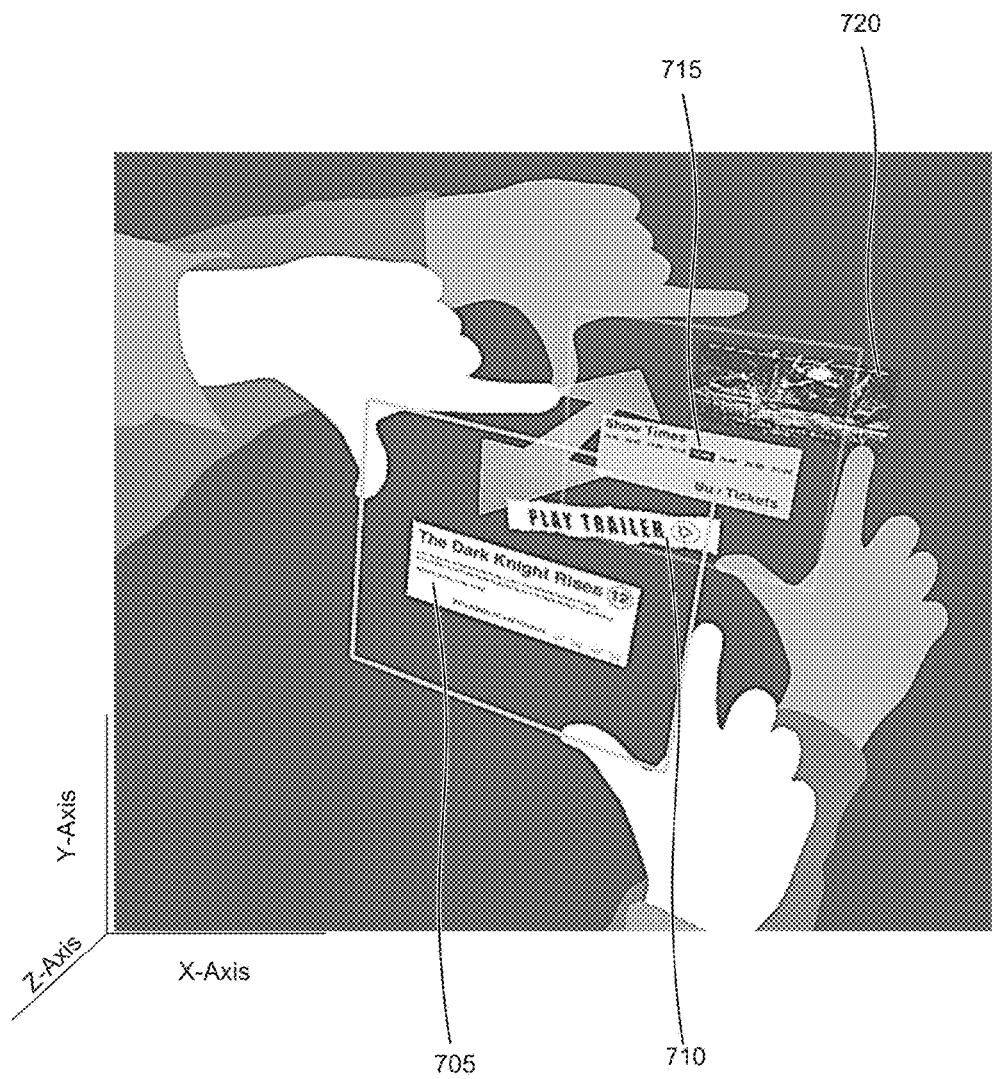
FIG. 7 illustrates a user browsing through multiple augmentations by scrolling in the direction of the target using VOI.

The flowchart illustrated by FIG. 2 describes a touch-less method of interacting with HMDs to select geo-located POIs (point of interest) and AR targets, according to an embodiment. By detecting a natural human body gesture, the HMD can select a subset of the POIs or AR targets seen through the glasses. FIG. 3A illustrates an exemplary method of interacting with HMDs to select an AR object using the method described in FIG. 2. The gesture can involve pointing both hands' index and thumb fingers in the orthogonal direction as shown in FIG. 3A and FIG. 4. After a ROI has been recognized by the HMD, a user can select the geo-located POIs or AR targets in a two or three dimensional space by further specifying the ROI or volume-of-interest (VOI), as shown in FIG. 3B, FIG. 5 and FIG. 7.

According to another embodiment, a depth-enabled camera (e.g., stereo camera) on the HMD can be used for using VOI to select an augmentation when the AR object has multiple augmentations associated with it. The depth-enabled camera can recognize the movement of the hands in front of the user or in the camera view. With these cameras, the HMD can recognize the position of the user's hands in relations to the target, and therefore display different augmentations based on the position.

Figure 6:
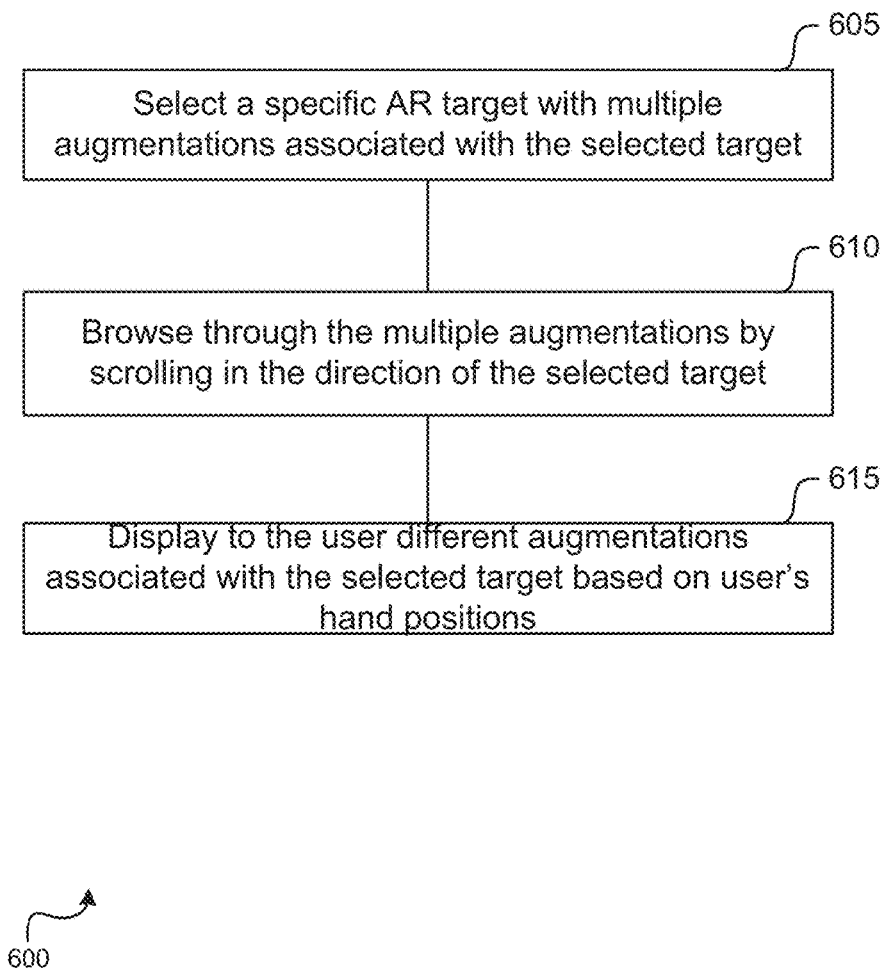
FIG. 6 illustrates a flowchart for selecting a specific layer of augmentation for AR targets.

For example, a user can select a specific layer of augmentation for AR targets, as further described in the flowchart illustrated by FIG. 6. First, a user can select a specific AR target by selecting the ROI. Moreover, if multiple augmentations are associated with a given AR target, the user can browse through them by scrolling in the direction of the target using VOL For example in FIG. 7, for the movie poster 720, the user can browse through three different augmentations 705, 710, 715 showing: the name of the movie with review; the trailer; and the show times associated with the movie. Depending on the hands position, the corresponding AR augmentation is shown to the user.

Figure 8:
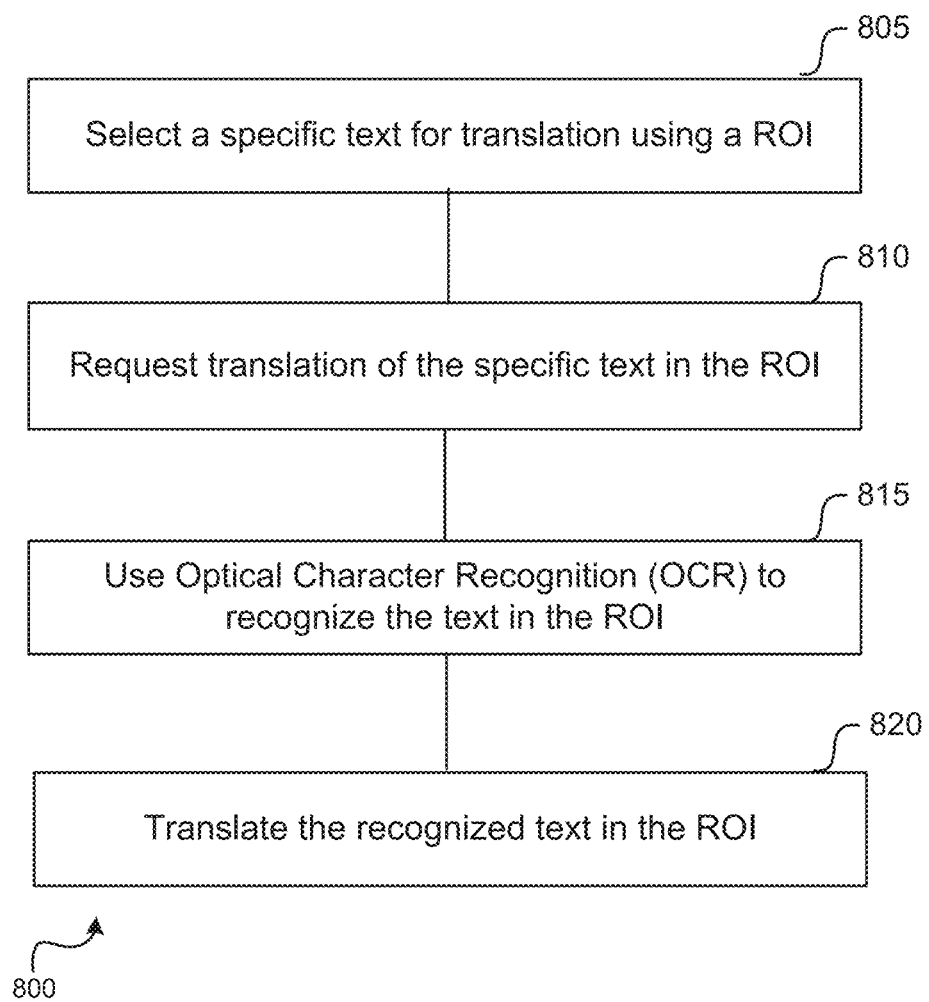
FIG. 8 illustrates a flowchart for initiating smart applications (e.g., translation, visual search) based on the ROI.

According to another embodiment, the system can initiating smart applications (e.g., translation, visual search) based on the ROI, as further described in the flowchart illustrated by FIG. 8. For example, a ROI can be fed to a visual search system or an optical character recognition (OCR) based translator and the results displayed on the HMD.

According to another embodiment, the ROI can be utilized to narrow the field of view for video sharing. For example, the ROI is treated as the shared view for a video based communication, so only part of his field of view (e.g., presentation, document) is shared with remote users.

Defining a Region-of-Interest Using Hand Gestures

FIG. 1A is simplified illustration 100 of an HMD 120 configured to define a region-of-interest (ROI) based on a user's gestures, according to one embodiment. In this embodiment, an HMD 120 worn by a user 110 has a camera and/or other sensor(s) configured to track the user's hand 130 in order to define the ROI. In so doing, the HMD 120 is able to display a shape outlining the ROI on the display 140 of the HMD 120. This can allow the user to give real-time feedback to adjust the ROI as desired, removing the need for a separate interface (e.g., touch pad, buttons) to receive user input. Other interfaces can be incorporated into the HMD 120, depending on desired functionality. The HMD 120 can utilize the one or more pre-installed camera(s) 150 to track the user's hand 130 in order to determine the ROI.

FIG. 1B is an illustration of an embodiment of an HMD 120 that can utilize the techniques provided herein. The embodiment shown includes displays 140 and one or more cameras 150. This embodiment includes a frame similar to glasses that can rest on the nose and ears of a user 110, positioning the displays 140 in front of a user's eyes.

The various embodiments enable the HMD 120 to capture user's hand 130 gestures using the sensors on the HMD 120. In an embodiment, the camera 150 may be a head mounted camera, which can generate image data that a processor can analyze to estimate distances to objects in the image through trigonometric analysis of the images. Alternatively or in addition, the HMD 120 may include one or more distance measuring sensors (e.g., a laser or sonic range finder) that can measure distances to various surfaces within the image. In the various embodiments a variety of different types of distance measuring sensors and algorithms may be used an imaged scene to measure for measuring distances to objects within a scene viewed by the user 110. Also, more than one sensor and type of sensor may be used in the HMD 120.

Further, the HMD 120 may include orientation sensors, such as accelerometers, gyroscopes, magnetic sensors, optical sensors, mechanical or electronic level sensors, and inertial sensors which alone or in combination can provide data to the device's processor regarding the up/down level orientation of the device (e.g., by sensing the gravity force orientation) and thus the user's head position orientation (and from that viewing perspective). Further, the HMD 120 may include rotational orientation sensors, such as an electronic compass and accelerometers that can provide data to the device's processor regarding left/right orientation and movement. Collectively, sensors (including accelerometers, gyroscopes, magnetic sensors, optical sensors, mechanical or electronic level sensors, inertial sensors, and electronic compasses) are configured to provide data regarding the up/down and rotational orientation of the HMD 120 (and thus the user's viewing perspective).

The HMD 120 may be configured to recognize user inputs, which may be made through gestures that may be imaged by the camera. A distance to the recognized object within the image may be determined from data gathered from the captured image and distance sensors. The HMD 120 may provide image and distance sensor data to and receive display information from a mobile processor which may be separate from the HMD 120, such as in a smartphone or other mobile device.

At least a portion of the displays 140 is transparent, providing a transparent display area that enables a user to view not only images shown on the displays 140, but also physical objects in the user's surroundings. The level of transparency of the images shown on the display 140 may vary, depending on the desired functionality of the displays 140, settings of a graphical user interface (GUI) shown on the display 140, and/or a software application executed by the HMD 120 (e.g., a video, a map, an internet browser). Although the embodiments shown in FIGS. 1A-B illustrate a display 140 positioned in a glasses-like frame, other technologies capable of providing a transparent display area (e.g., a retinal projector or other optical system) can be utilized in other embodiments.

Furthermore, The camera(s) 150 (e.g., outward-facing cameras) can capture images of the user's surroundings, including the user's hand 130 and/or other objects that can be controlled by the user 110 to provide input to the HMD 120. The cameras can include other types of sensors that provide images and/or other information to a processing unit that enables the HMD 120 to track a physical object (e.g., POI) in front of the user. In one embodiment, the HMD 120 can employ a camera 150 capable of determining depth (e.g., stereo camera) to track an object's depth as well. According to one embodiment, the depth camera can be utilized when using VOI to display multiple augmentations, as shown in FIG. 7.

The camera(s) 150 can have a field of view that enables the HMD 120 to track an object (e.g., hand gestures) that appears within the transparent display area from the perspective of the user. Embodiments may switch to a low-power mode when the physical object is not within the transparent display area from the perspective of the user 110. In some embodiments, the camera(s) 150 can have a field of view that is broader than the transparent display area, to allow the HMD 120 to begin executing and/or scale up object-tracking algorithms when the HMD 120 determines the physical object is approaching the transparent display area (from the perspective of the user 110).

Selecting a Specific AR Target from a Plurality of AR Targets

FIG. 2 is a flow diagram illustrating an embodiment of a method 200 of selecting an augmented reality (AR) object on a head-mounted display (HMD). At block 205, the HMD defines a region-of-interest (ROI) based on user's gesture.

A detection algorithm can be used to detect a user's gesture. The HMD can detect a predetermined gesture of a user and define the ROI based on the user's gesture. For example, a user's gesture can include pointing the index and thumb fingers of both hands in the orthogonal direction to create a rectangular shape as illustrated in FIGS. 3A and 3B. In other instances, the user's gesture can include a fist, an open hand, pointing with finger(s), a hand rotation, a wave, a movement of one or more fingers, and any combination thereof.

Additionally, according to another embodiment, a subsequent user gesture can occur after the ROI is defined. For example, the gesture may include drawing the hands of the user apart/closer for resizing the ROI. In other instances, the subsequent user gesture may include a tap gesture for taking a picture, a push gesture for guiding an AR object across the screen, a flick gesture for moving the AR object, a turn gesture for rotating the AR object, a grab/pull gesture for zoom operations, a swipe gesture for scrolling through media.

As indicated above, the transparent display area can be at least a portion of a display and/or display means of an HMD 120 configured to allow a user to view images shown on the display as well as physical object in the user's surroundings. The user can select a ROI based on the user's hand gesture. FIG. 3A further illustrates how the HMD 120 identifies the ROI.

At block 210, a shape outlining the ROI within the transparent display area is defined and displayed to the user. The shape can be, for example, a rectangular overlay outlining the ROI on the HMD 120. The shape can give the user the visual feedback of the ROI's location. The shape itself may or may not be highlighted and/or otherwise indicated in the transparent display area. Defining the shape may be performed, for example, by a processing unit, memory, and/or other computing means, which can be part of a computing system incorporated into and/or communicatively coupled with the HMD. The shape may be displayed as extending from a display element, for example from the edge of the display screen. Moreover, as discussed in more detail below, the shape may be associated with interactive elements, digital content, and/or physical objects in an AR or other software application. Such shape may change in size, shape, and location within the display area as, for example, a user moves in relation to a physical object. As a result, the highlights showing the shape associated with the selected object(s) may or may not be displayed at all times.

The various embodiments enable a HMD 120 to render a virtual shape outlining the ROI on the display 140. This enables the HMD 120 to provide an augmented reality experience that can facilitate interactions with a computing device and real-time collaboration and feedback from the user.

In some embodiments, the HMD 120 can process recognized gestures as input commands to execute tasks on the HMD 120. Methods may be implemented in a computing device having a processor configured with processor-executable instructions to perform the operations. The processor may commence operation by receiving sensor data regarding an orientation of the HMD 120. Additionally, the processor may receive image data from the cameras 150, as well as data from other sensors included in the HMD 120 described above. Thus, the processor may obtain all information gathered by the HMD 120 regarding images and distances to objects within the field of view of the camera(s) 150. The processor may calculate distance and orientation data of objects in the ROI. These calculations may use well known trigonometric methods when images are provided in block, direct measurements when distance sensors are used to provide distance data, and combinations of distance information obtained from sensors and calculated from images. Furthermore, the processor may process the image using distance sensor data, camera data and the distance and orientation data.

Furthermore, the processor may track the user's hand 130 over a time interval to determine if a predetermined gesture is recognized. In this determination, the processor may determine whether any gestures are recognized in the field of view. If the gesture is recognized, the processor may substantially match the recognized gesture with an input command stored in memory of the HMD 120. The processor may execute the input command that corresponds to the recognized gesture.

According to one embodiment, once the ROI is identified, a picture and/or video can be capture of the image inside the ROI when the user 110 disengages. For example, if the user continues to maintain the hand gesture after receiving the shape outlining the ROI, such as a camera taking pose, the HMD 120 can be setup to capture the image outlined by the ROI after the user disengages. An example of a disengagement event can be when the user's hands quickly move away from the ROI. Therefore, unlike a conventional HMD, a user does not actually need to touch a button on the conventional HMD to take a picture.

According to another embodiment, the HMD 120 can capture a video of fixed buffer size. In this instance, the gesture mechanism can be used as a trigger to indicate to the HMD to save all the frames from the last predetermined duration (e.g., 30 seconds). For example, a user wearing the HMD 120 may have just seen a whale jump out of the ocean, and verbally request the HMD 120 to record the past 30 seconds. Therefore the HMD 120 can have a functionality wherein it is buffering the frames and based on a recognized gesture or voice command, the HMD 120 can store those frames into memory.

At block 215, after the ROI has been recognized, the HMD 120 displays to the user 110 a plurality of AR objects (e.g., Rita's Fashion 405 in FIG. 4) associated with targets inside the ROI. Additionally, the targets initially inside the ROI can be tracked as the user moves the ROI or the user's field of view. Means for tracking can be performed by a camera, sensor, and/or other components configured to capturing image and/or position measurements, communicatively connected with a processing unit, memory, and/or other computing means configured to determine a position based on the image and/or position measurements. Components for tracking the target can be calibrated with components for displaying images in the transparent display area, enabling the HMD to determine what the user sees.

Tracking means may engage any of a variety of tracking algorithms. Certain tracking algorithms may simply track a single point (e.g., a coordinate on the transparent display area) and/or region associated with the object and/or a location on the object (e.g., hand(s) of the user). More sophisticated tracking algorithms may track other features, such as the object's distance. Embodiments may be able to track multiple and/or different target for AR interaction.

Once the plurality of AR objects are displayed to the user using block 215, the user may then want to select a specific AR object, as described in block 220, for further manipulation of the selected object.

For example, when a user is wearing the HMD and advertisement and banners associated with a plurality of AR object can pop up. It can be distracting and annoying if all the functionalities are coming alive at the same time. By reducing the size of the ROI, the user can reduce the number of AR objects for interaction.

At block 220, a user can reduce or enlarge the size of the ROI based on the movement of the user's hand, as further illustrated in FIGS. 3A-3B. By manipulating the ROI using real-time user feedback, the user 110 can select a specific AR object in real-time. Here again, means for reducing or enlarging the size of the ROI can include a processing unit, memory, and/or other computing means coupled to a display showing the ROI.

At block 225, the HMD 120, using the reduced-size ROI from block 220, selects a specific AR object from the plurality of AR objects in block 215. For example, using Qualcomm's Vuforia, AR targets can be displayed on an HMD display 140 by the HMD 120.

Augmented reality functionality can be used in countless scenarios to enable the user to learn more about the user's surroundings. For example, as later described in FIGS. 6 and 7, an HMD 120 can recognizes a movie poster with AR associated with the movie poster, then the HMD 120 can display a virtual "play trailer" button, which can be activated with another hand gesture. Countless other scenarios are contemplated. Thus, techniques provided herein can be expanded to augmented reality scenarios, enabling interactions with elements of digital content, from the perspective of the user, to the selected object. Because these interactive elements are bound to selected objects in the user's surroundings, corresponding ROI on the HMD's display 140 can move and scale relative to the selected object's position. Additionally, according to some embodiments, the selected AR object can then be further manipulated using the methods described in FIGS. 6 and 8.

An example of an AR platform is the Qualcomm Vuforia™ augmented reality platform, which can provide more information to the display 140 of the HMD and/or mobile device once a user has selected a target through the use of augmented reality. For example, Vuforia's computer vision functionality can recognize a variety of 2D and 3D visual targets, and display AR associated with the recognized targets. Therefore, a user can select a real world target and AR associated with the selected target may be displayed on the display 140 of the HMD 120. In some instances, advertising can jump off the printed page, or product packaging can come alive on retail shelves. Additionally, products themselves can provide enhanced interactivity to provide instructions.

Therefore, the AR can enhance the value of print media and advertising, consumer products and packaging, and educational materials. The AR associated with the selected target in block 225 can enable real-world interactivity. For example, AR can be associated with printed advertising, products and packaging, and in retail environments.

It should be appreciated that the specific steps illustrated in FIG. 2 provide an example of a method 200 of enabling user interaction with an HMD 120. Alternative embodiments may include alterations to the embodiments shown. For example, alternative embodiments may include defining the shape within the transparent display area, displaying the shape outlining the ROI, displaying the AR(s) at different points during the method 200. Yet other embodiments may include performing actions to calibrate the defining the ROI, displaying the shape and tracking components with the display components of the HMD 120. Furthermore, additional features may be added, removed, or combined depending on the particular applications. One of ordinary skill in the art would recognize many variations, modifications, and alternatives.

Defining a ROI Based on User's Gesture

FIGS. 3A and 3B illustrate a touch-less method of interacting with HMDs to select a specific AR object 320. By detecting a natural human body gesture, the HMD 120 can be triggered to capture the image or video seen through the glasses. As illustrated in FIG. 3A, the hands are placed in such a way that a rectangle is formed with the fingers and thumbs being the edges. The area inside this rectangle can be treated as the Region-of-Interest (ROI) for the user 110.

FIG. 3A illustrates a method for defining the ROI 305 based on user's gesture, as previously described in block 205. For example, the gesture can involve pointing both hands' index 350 and thumb 355 fingers in the orthogonal direction.

As illustrated in FIG. 3A, the gesture can include pointing the index and thumb fingers of both hands in the orthogonal direction to create a rectangular. In one instance, the gesture can include using the thumb 355 and fingers 360 to form a C-shape. In other instances, the gesture can include a fist, an open hand, pointing with finger(s), a hand rotation, a wave, a movement of one or more fingers, and any combination thereof.

FIG. 3B illustrates a method for reducing or enlarging the size of the ROI 305 to select a specific AR object 320. For example, the gesture can involve bringing in the hands together to reduce the size of the ROI. Alternatively, the gesture can involve moving the hands out to enlarge the size of the ROI.

According to other embodiments, once the ROI has been defined, the user can manipulate the AR objects inside the ROI using a subsequent user gesture. For example, the gesture may include drawing the hands of the user apart/closer for resizing the ROI. In other instances, the subsequent user gesture may include a tap gesture for taking a picture, a push gesture for guiding an AR object across the screen, a flick gesture for moving the AR object, a turn gesture for rotating the AR object, a grab/pull gesture for zoom operations, a swipe gesture for scrolling through media, and any combination thereof.

The HMD 120 can track the user's hand 130, enabling the user 110 to interact and define a ROI 305. For example, the user can make a gesture in various ways, such as by moving the user's hand 130 to form a rectangle, engaging in a camera-taking pose, performing a predetermined movement, or keeping a hand shape in the element's proximity for a threshold amount of time.

An example of a camera-taking pose is for the user 110 to create two C-shaped using his hands. However with the camera-taking pose, the hands can only be moved apart horizontally not diagonally and therefore the resizing of the ROI cannot be redefine as a larger rectangle area, only a wider one.

In another embodiment, the ROI can be based on one hand in an L-shape as the base the ROI in relations to the distance between the center of the camera view and the user's hand 130. In this example, the user's field of view in the HMD 120 and where the corner of the "L" that's defined by the hand is can be used to define the ROI. A feedback from the HMD 120 can be a little red dot that marks the center of the display 140 and a rectangle that marks where the border of the ROI. The ROI can get larger or smaller depending on the user's hand 130 relative to the center field of view.

The HMD 120, after recognizing selection of the gesture, can display to the user a shape 315 on the HMD. The shape 315 (e.g., rectangular overlay) can outline the ROI 305. The user can adjust the ROI 305 in real-time by moving the hand(s) inward or outward. Depending on desired functionality, if only one hand is used, the shape displayed on the HMD 120 can be anchored to a dot on the display (e.g., dot in the middle of the display) so that the user can adjust the shape accordingly without the need of both hands to outline the border of the shape.

For example, the HMD 120 indentifies the ROI 305 (e.g., rectangle) by tracing the finger tips or the outline formed by the shape of the hands. Once the ROI 305 is detected, the HMD 120 displays to the user as the overlaid projection of the shape 315 on the HMD glasses, as previously mentioned in block 210. Then the user can adjust the size of the ROI as previously mentioned in block 220, by moving the hands before disengaging, as shown in FIG. 3B.

FIG. 3B illustrates how the selected ROI can be adjusted based on real-time user input. For example, the ROI 305 is initially selected by the user in FIG. 3A. In FIG. 3B, the AR object 320 can be selected by moving the hands closer together or farther apart. The HMD using object recognition techniques can determine that the ROI 305 is decreasing or enlarging based on the user's hand movement.

According to another embodiment, the system can use a hand gestures and/or voice commands to activate the camera on the HMD. Once the reduced-sized ROI is identified, a picture and/or video can be capture of the image inside the ROI 305. Alternatively, the gesture mechanism and voice command can be used as a trigger to indicate to the HMD to save all the frames from the last predetermined duration (e.g., 30 seconds).

Furthermore, a disengagement event can occur when the hands are sufficiently away from the field of view of the target. The disengagement event can also occur if the fingers and thumbs are closed together or by a voice driven command. The disengagement event can signal to the HMD 120 that detection and selection of the ROI 305 is complete. Therefore, according to one embodiment, the HMD 120 can turn off some of the sensors and go into low power mode.

A disengaging event can include when the hands are not close enough. The HMD 120 can track the hands and the shaped formed by the hands' edge continuously; therefore the HMD 120 can determine when the hands are apart by a predetermined distance.

Therefore, the HMD 120 can determine if the hands have been moved apart by more than a threshold then it can assume that disengagement has occurred. For example, a user can move his hand apart so that they are not close to the ROI.

However, the HMD 120 can implement a feature that can distinguish when the user is trying to make the region of interest larger or if the user is trying to disengage when the hands moving apart. For example, the HMD 120 can distinguish between resizing the ROI versus a disengaging event based on the hands location in relations to the ROI and the speed of the hand movement.

Alternatively, closing just one hand can be a disengaging event. For example, when the HMD 120 determines that it cannot detect an octagonal frame from the outline of the hands, the HMD 120 can assume that the user disengaged.

Displaying a Plurality of AR Objects

FIG. 4 illustrates an example of a user's view through the display 140 of an HMD 120. As illustrated in FIG. 4, a plurality of AR objects associated with targets inside the ROI 305 is shown on the display 140. As previously mentioned in block 215, after a user selects a ROI 305, the HMD 120 displays to the user a plurality of AR objects associated with target (e.g., point-of-interests (POIs)) inside the ROI. Additionally, the targets initially inside the ROI can be tracked as the user moves the ROI 305 or the user's field of view.

Once the ROI 305 has been defined, the HMD 120 can display to the user the targets which have associated AR applications. Once the HMD has detected the ROI 305 and/or display to the user a shape 315 outlining the ROI, it can initiate AR applications. After the HMD detects a ROI 305, it can initiate the associated AR application within the ROI 305. For example, in FIG. 4, the user is displayed five objects (e.g., POI) with associated AR applications. In this example, the following five objects are inside the ROI: Rita's Fashion 405 which is 50 meters away; Starbucks 410; Henry's diner 415; Henry's diner 420; and the cinema 425. According to one embodiment, the display 140 can also show other relevant information about the objects (e.g., reviews, distance from the user).

In some instances, advertisers can register their project banners/logo/wrappers as AR targets. For example, using Qualcomm's Vuforia, targets can have additional information that can be display on an HMD display 140 using AR. Therefore, when a user reduces the ROI 305 to select an AR target 320, an AR animation associated with the selected target can gives extra information.

FIG. 5 illustrates an example of the ROI 305 being reduced by the user, which results in less AR targets or POIs being shown on the display 140. As described in block 220, a user can reduce the size of the ROI 305 using hand gestures (e.g., by moving hands closer). Using the reduced-sized, the display 140 in FIG. 5 now only has three 3 POIs (Starbucks 505, Henry's Diner 510, Henry's Diner 515) inside the ROI. By reducing the size of the ROI, the number of targets inside the ROI has been reduced from five POIs in FIG. 4 to three POIs in FIG. 5. According to another embodiment, the user can further reduce the size of the ROI so that only one AR target 320 is inside the ROI 305.

According to some embodiments, a selected AR target 320 may have multiple augmentations associated with it. During this scenario, a user can use volume-of-interest (VOI) techniques, as further described in FIGS. 6 and 7, to select a specific layer of augmentation for the selected AR target 320.

Using Volume of Interest when a Selected Target has Multiple Augmentations

FIG. 6 is a flow diagram illustrating an embodiment of a method 600 of defining a volume-of-interest (VOI) using hand gestures along the direction of the target (e.g., z-axis). For example, the user can browse through the geo-located points or different augmentations for the same target by scrolling one or more hands along the z-axis. As shown in FIG. 2, a user has reduced the size of the ROI to select a target. After selecting a target, in some instances, the selected target may have multiple augmentations associated with it.

At block 605, the HMD has already defines a ROI based on user's gesture, as previously described in FIG. 2. By manipulated the ROI using real-time user feedback, the user can select a specific AR in real-time, similar to block 225. Moreover, if multiple augmentations are associated with a given AR target, a user can specify a specific layer using the method described in block 610.

At block 610, a user can browse through the multiple augmentations by scrolling in the direction (e.g., z-axis) of the selected target. For example, a user can select a specific layer of augmentation for an AR target 320 by browse through them by scrolling in the direction of the target using VOI, as illustrated in FIG. 7.

At block 615, the system displays to the user different augmentations by associated with the selected target based on user's hand position (e.g., along the z-axis as illustrated in FIG. 7).

FIG. 7 illustrated the real-time interaction and display of different augmentation based on user's hand position. For example, a user can select a movie poster using the method described in FIG. 2. In some instances, there may be multiple augmentations associated with the selected movie poster. Using the method described in FIG. 6, the user can browse through the different augmentations associated with the movie poster.

As illustrated in the different positions in FIG. 7, different augmentations can be displayed to the user based on the user's hand position. For example, when the user's hand position is at 705, the display 140 of the HMD 120 shows the name of the movie and the reviews. Position 710 can occur when the user's hand position moves closer in the direction of the target 720 (e.g., z-axis) in relations to position 705. At position 710, in this example, the augmentation for playing the trailer of the movie is shown on the display 140. As the user's hand position moves closer to the target, at position 715, the show times of the movie and the option to purchase tickets online can be displayed. Finally, in this example, at the position closest to the target 720, the HMD 120 can display images associated with the movie.

As illustrated by the example in FIGS. 6 and 7, the HMD 120 can use hand positions and/or hand gestures to define a VOL Based on the VOI, the HMD 120 can display different augmentations associated with a selected target. Alternatively, once a target is selected, the HMD 120 can implement other modes based on user's preferences or predetermined gesture recognized functions, as illustrated in FIG. 8.

Example of other Implementations Once the Target is Selected

FIG. 8 is a flow diagram illustrating an embodiment of a method 800 of initiating a smart application based on the selected ROI. One example of a smart application can include a visual translator. For example, the image captured inside the ROI can be fed to a visual search system or an (OCR). In this example, the OCR can be used to determine and recognize the text from the image. Based on the recognized characters, a translator can automatically translate and the results can be displayed on the display 140.

To illustrate this embodiment, at block 805, the user can select a specific target or text for translation. Similar to the method described in FIG. 2, the user can use hand gestures to outline a ROI 305 for selecting a text for translation.

At block 810, a user can request a translation of the specific text in the ROI 305. For example, the user can use voice commands or predetermined hand gestures to initiate the translation. Alternatively, the HMD 120 can automatically recognize a foreign language and initiate a translation without a request from a user.

At block 815, the HMD 120 can use visual search system or an OCR to recognize the text in the ROI 305. Conventional methods for text recognition can be utilized by the HMD 120.

At block 820, the HMD 120 can translate the recognized text to a language specified by the user and show it on the display 140. For example, the language can be a default language, predetermined based on prior usage, or specified in real-time by the user. Additionally, the HMD 120 can read the translated text out loud to the user 110. Conventional methods for text translation can be utilized by the HMD 120.

FIG. 8 illustrates an example of one implementation once the target is selected using hand gestures. Alternative embodiments may include alterations to the embodiments shown. For example, alternative embodiments may include the HMD automatically recognizing a foreign language and translating the text without a request from the user. Furthermore, additional features may be added, removed, or combined depending on the particular applications. One of ordinary skill in the art would recognize many variations, modifications, and alternatives.

According to another embodiment, the ROI can be utilized to narrow the field of view for video sharing. The HMD 120 can use the ROI as the shared view during a collaboration mode. When a user wants a share a part of his field of view, the user can select a ROI 305 using the method described in FIG. 2. During a collaboration mode, the HMD 120 can treat the ROI 305 as the shared view for a video based communication, so only part of his field of view (e.g., presentation, document) is shared with remote users. According to one embodiment, the shared view can be concluded once a disengagement event occurs. Alternative embodiments may include alterations to the embodiments shown. Furthermore, additional features may be added, removed, or combined depending on the particular applications.

Figure 9:
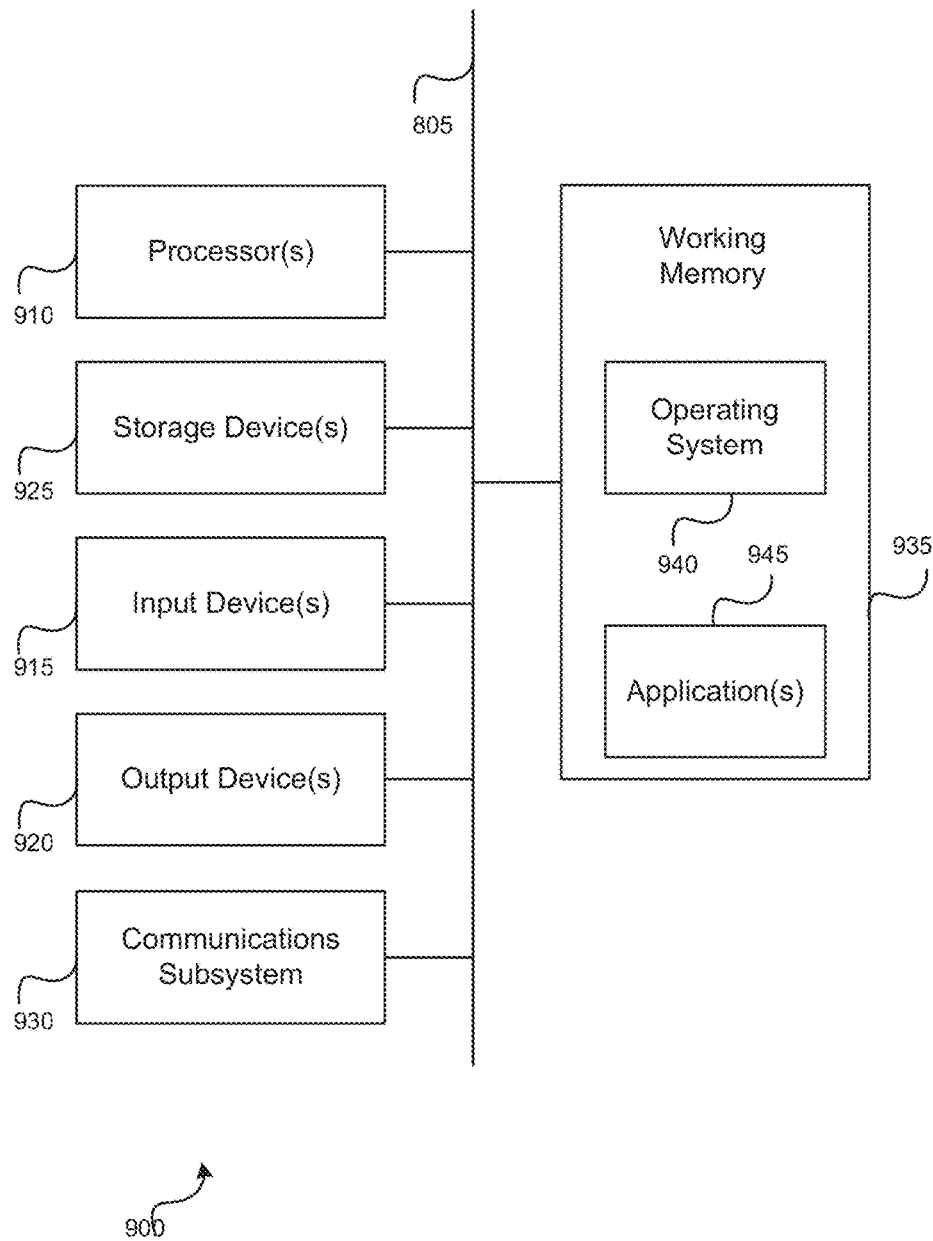
FIG. 9 illustrates an example of a computing system in which one or more embodiments may be implemented.

FIG. 9 illustrates an example of a computing system in which one or more embodiments may be implemented.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. For example, the storage devices 925 can be used to buffer video captured from the camera 150 of the HMD 120, in the event the user wants to capture the all the frames from the last predetermined duration.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may include one or more input and/or output communication interfaces to permit data to be exchanged with a network, other computer systems, and/or any other electrical devices/peripherals. In many embodiments, the computer system 900 will further comprise a working memory 935, which can include a RAM or ROM device, as described above. The communication subsystem 930 can be used to link the HMD 120 to the user's smartphone.

The computer system 900 also can comprise software elements, shown as being currently located within the working memory 935, including an operating system 940, device drivers, executable libraries, and/or other code, such as one or more application(s) 945, which may comprise computer programs provided by various embodiments, and/or may be designed to implement methods, and/or configure systems, provided by other embodiments, as described herein. Merely by way of example, a portion of one or more procedures described with respect to the method(s) discussed above, such as the method 200 described in relation to FIG. 2, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware. Merely by way of example, a portion of one or more procedures described with respect to the method(s) discussed above, such as the method 200 described in relation to FIG. 2, might be implemented by the processor 910 in the HMD 120. Alternatively, the HMD 120 can be linked to a smartphone via the communications subsystem 930, and the method of FIG. 2 can be implemented by the processor 910 in the smartphone.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 825 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A method for selecting an Augmented Reality (AR) object on a head mounted device (HMD) comprising:
  defining a first Region-of-Interest (ROI) based on a first gesture of at least one hand of a user in a field of view of the HMD, wherein at least a portion of the first ROI is defined by a position of the at least one hand of the user, wherein the first ROI is defined within a display area displaying one or more images of a scene captured by the HMD, and wherein the first ROI includes a plurality of targets within the scene;
  displaying, on the HMD, a first shape outlining the first ROI, wherein the first shape is displayed in a two-dimensional plane;
  defining a second ROI based on a second gesture, the second gesture being performed by a first movement of the at least one hand of the user, wherein the second ROI is defined within the display area displaying the one or more images of the scene captured by the HMD, and wherein the second ROI is a reduced-size region that is smaller than the first ROI;

displaying, on the HMD, a second shape outlining the second ROI, the second shape being smaller than the first shape;

selecting one or more AR objects for display within the second shape outlining the second ROI based on a subset of the plurality of targets being within the second ROI, the one or more AR objects being associated with the subset of the plurality of targets within the second ROI;

selecting, based on a third gesture, a first AR object or a second AR object from the one or more AR objects associated with the subset of the plurality of targets within the second ROI, the third gesture being performed by a second movement of the at least one hand of the user in a third dimension relative to the two-dimensional plane, wherein the first AR object is selected for display within the second shape when the at least one hand of the user is moved to a first depth relative to the two-dimensional plane, and wherein the second AR object is selected for display within the second shape when the at least one hand of the user is moved to a second depth relative to the two-dimensional plane, the first depth being different from the second depth; and displaying, on the HMD, the first AR object or the second AR object in association with a first target of the subset of the plurality of targets based on the third gesture.

2. The method of claim 1, wherein at least the portion of the first ROI is defined by two hands of the user.

3. The method of claim 2, wherein the second movement for selecting the first AR object or the second AR object for display comprises of moving the two hands in the third dimension.

4. The method of claim 1, further comprising:
displaying, on the HMD, the first AR object or the second AR object within the displayed second shape outlining the second ROI based on the third gesture; and
removing from display at least one AR object that is outside of the second ROI in response to reducing a size of the displayed first ROI to form the second ROI.

5. The method of claim 1, further comprising:
capturing text inside one or more of the first shape outlining the first ROI or the second shape outlining the second ROI; and
initializing translation based on the captured text.

6. The method of claim 1, further comprising:
performing a visual recognition search inside one or more of the first shape outlining the first ROI or the second shape outlining the second ROI.

7. The method of claim 1, further comprising:
disengaging the second shape outlining the second ROI based on a disengagement event.

8. The method of claim 7, wherein the disengagement event occurs when the at least one hand of the user is away from the second ROI, when at least one finger and thumb of the user are closed together, or when a voice command to disengage is made by the user.

9. The method of claim 1, wherein the first ROI includes a plurality of sides and wherein two sides of the plurality of sides are defined by the at least one hand of the user when the at least one hand is stationary.

10. The method of claim 1, further comprising:
determining a distance from the user to each of the plurality of targets; and
displaying, to the user, the distance to each of the plurality of targets.

11. The method of claim 10, wherein the HMD includes one or more distance-measuring sensors, and wherein the determining the distance from the user to each of the plurality of targets is based on measurements captured by the one or more distance-measuring sensors.

12. The method of claim 10, wherein the HMD includes a stereoscopic camera, and wherein the determining the distance from the user to each of the plurality of targets is based on trigonometric analysis of one or more images captured by the stereoscopic camera.

13. The method of claim 10, wherein each of a plurality of displayed distances is a part of a respective one of a plurality of AR objects.

14. A head mounted device (HMD) for selecting an Augmented Reality (AR) object comprising:
one or more processors; and
memory storing computer-readable instructions that, when executed by the one or more processors, cause the HMD to:
define a first Region-of-Interest (ROI) based on a first gesture of at least one hand of a user in a field of view of the HMD, wherein at least a portion of the first ROI is defined by a position of the at least one hand of the user, wherein the first ROI is defined within a display area displaying one or more images of a scene captured by the HMD, and wherein the first ROI includes a plurality of targets within the scene;
display, on the HMD, a first shape outlining the first ROI, wherein the first shape is displayed in a two-dimensional plane;
define a second ROI based on a second gesture, the second gesture being performed by a first movement of the at least one hand of the user, wherein the second ROI is defined within the display area displaying the one or more images of the scene captured by the HMD, and wherein the second ROI is a reduced-size region that is smaller than the first ROI;
display, on the HMD, a second shape outlining the second ROI, the second shape being smaller than the first shape;
select one or more AR objects for display within the second shape outlining the second ROI based on a subset of the plurality of targets being within the second ROI, the one or more AR objects being associated with the subset of the plurality of targets within the second ROI;
select, based on a third gesture, a first AR object or a second AR object from the one or more AR objects associated with the subset of the plurality of targets within the second ROI, the third gesture being performed by a second movement of the at least one hand of the user in a third dimension relative to the two-dimensional plane, wherein the first AR object is selected for display within the second shape when the at least one hand of the user is moved to a first depth relative to the two-dimensional plane, and wherein the second AR object is selected for display within the second shape when the at least one hand of the user is moved to a second depth relative to the two-dimensional plane, the first depth being different from the second depth; and display, on the HMD, the first AR object or the second AR object in association with a first target of the subset of the plurality of targets based on the third gesture.

15. The HMD of claim 14, wherein at least the portion of the first ROI is defined by two hands of the user.

16. The HMD of claim 15, wherein the second movement for selecting the first AR object or the second AR object for display comprises of moving the two hands in the third dimension.

17. The HMD of claim 14, wherein the computer-readable instructions further cause the HMD to:
display, on the HMD, the first AR object or the second AR object within the displayed second shape outlining the second ROI based on the third gesture; and
remove from display at least one AR object that is outside of the second ROI in response to reducing a size of the first ROI to form the second ROI.

18. The HMD of claim 14, wherein the computer-readable instructions further cause the HMD to:
capture text inside one or more of the first shape outlining the first ROI or the second shape outlining the second ROI; and
initialize translation based on the captured text.

19. The HMD of claim 14, wherein the computer-readable instructions further cause the HMD to:
perform a visual recognition search inside one or more of the first shape outlining the first ROI or the second shape outlining the second ROI.

20. The HMD of claim 14, wherein the computer-readable instructions further cause the HMD to:
disengage the second shape outlining the second ROI based on a disengagement event.

21. The HMD of claim 20, wherein the disengagement event occurs when the at least one hand of the user is away from the second ROI, when at least one finger and thumb of the user are closed together, or when a voice command to disengage is made by the user.

22. One or more non-transitory computer-readable media storing computer-executable instructions for selecting an Augmented Reality (AR) object on a head mounted device (HMD) that, when executed, cause one or more computing devices included in a HMD to:
define a first Region-of-Interest (ROI) based on a first gesture of at least one hand of a user in a field of view of the HMD, wherein at least a portion of the first ROI is defined by a position of the at least one hand of the user, wherein the first ROI is defined within a display area displaying one or more images of a scene captured by the HMD, and wherein the first ROI includes a plurality of targets within the scene;
display, on the HMD, a first shape outlining the first ROI, wherein the first shape is displayed in a two-dimensional plane;
define a second ROI based on a second gesture, the second gesture being performed by a first movement of the at least one hand of the user, wherein the second ROI is defined within the display area displaying the one or more images of the scene captured by the HMD, and wherein the second ROI is a reduced-size region that is smaller than the first ROI;
display, on the HMD, a second shape outlining the second ROI, the second shape being smaller than the first shape;
select one or more AR objects for display within the second shape outlining the second ROI based on a subset of the plurality of targets being within the second ROI, the one or more AR objects being associated with the subset of the plurality of targets inside of within the second ROI;
select, based on a third gesture, a first AR object or a second AR object from the one or more AR objects associated with the subset of the plurality of targets within the second ROI, the third gesture being performed by a second movement of the at least one hand of the user in a third dimension relative to the two-dimensional plane, wherein the first AR object is selected for display within the second shape when the at least one hand of the user is moved to a first depth relative to the two-dimensional plane, and wherein the second AR object is selected for display within the second shape when the at least one hand of the user is moved to a second depth relative to the two-dimensional plane, the first depth being different from the second depth; and
display, on the HMD, the first AR object or the second AR object in association with a first target of the subset of the plurality of targets based on the third gesture.

23. The one or more non-transitory computer-readable media of claim 22, wherein at least the portion of the first ROI is defined by two hands of the user.

24. The one or more non-transitory computer-readable media of claim 23, wherein the second movement for selecting the first AR object or the second AR object for display comprises of moving the two hands in the third dimension.

25. The one or more non-transitory computer-readable media of claim 22, wherein the computer-executable instructions further cause the one or more computing devices to:
display, on the HMD, the first AR object or the second AR object within the displayed second shape outlining the second ROI based on the third gesture; and
remove from display at least one AR object that is outside of the second ROI in response to reducing a size of the first ROI to form the second ROI.

26. The one or more non-transitory computer-readable media of claim 22, wherein the computer-executable instructions further cause the one or more computing devices to:
capture text inside one or more of the first shape outlining the first ROI or the second shape outlining the second ROI; and
initialize translation based on the captured text.

27. The one or more non-transitory computer-readable media of claim 22, wherein the computer-executable instructions further cause the one or more computing devices to:
perform a visual recognition search inside one or more of the first shape outlining the first ROI or the second shape outlining the second ROI.

28. The one or more non-transitory computer-readable media of claim 22, wherein the computer-executable instructions further cause the one or more computing devices to:
disengage the second shape outlining the second ROI based on a disengagement event.

29. The one or more non-transitory computer-readable media of claim 28, wherein the disengagement event occurs when the at least one hand of the user is away from the second ROI, when at least one finger and thumb of the user are closed together, or when a voice command to disengage is made by the user.

30. A head mounted device (HMD) for selecting an Augmented Reality (AR) object comprising:
    means for defining a first Region-of-Interest (ROI) based on a first gesture of at least one hand of a user in a field of view of the HMD, wherein at least a portion of the first ROI is defined by a position of the at least one hand of the user, wherein the first ROI is defined within a display area displaying one or more images of a scene captured by the HMD, and wherein the first ROI includes a plurality of targets within the scene;
    means for displaying, on the HMD, a first shape outlining the first ROI, wherein the first shape is displayed in a two-dimensional plane;
    means for defining a second ROI based on a second gesture, the second gesture being performed by a first movement of the at least one hand of the user, wherein the second ROI is defined within the display area displaying the one or more images of the scene captured by the HMD, and wherein the second ROI is a reduced-size region that is smaller than the first ROI;
    means for displaying, on the HMD, a second shape outlining the second ROI, the second shape being smaller than the first shape;
    means for selecting one or more AR objects for display within the second shape outlining the second ROI based on a subset of the plurality of targets being within the second ROI, the one or more AR objects being associated with the subset of the plurality of targets within the second ROI;
    means for selecting, based on a third gesture, a first AR object or a second AR object from the one or more AR objects associated with the subset of the plurality of targets within the second ROI, the third gesture being performed by a second movement of the at least one hand of the user in a third dimension relative to the two-dimensional plane, wherein the first AR object is selected for display within the second shape when the at least one hand of the user is moved to a first depth relative to the two-dimensional plane, and wherein the second AR object is selected for display within the second shape when the at least one hand of the user is moved to a second depth relative to the two-dimensional plane, the first depth being different from the second depth; and
    means for displaying, on the HMD, the first AR object or the second AR object in association with a first target of the subset of the plurality of targets based on the third gesture.

31. The HMD of claim 30, further comprising:
    means for displaying, on the HMD, the first AR object or the second AR object within the displayed second shape outlining the second ROI based on the third gesture; and
    means for removing from display at least one AR object that is outside of the second ROI in response to reducing a size of the first ROI to form the second ROI.

* * * * *